(12) United States Patent
Leleannec et al.

(10) Patent No.: US 10,356,444 B2
(45) Date of Patent: Jul. 16, 2019

(54) METHOD AND APPARATUS FOR ENCODING AND DECODING HIGH DYNAMIC RANGE (HDR) VIDEOS

(71) Applicant: THOMSON LICENSING, Issy les Moulineaux (FR)

(72) Inventors: Fabrice Leleannec, Mouaze (FR); Sebastien Lasserre, Thorigne Fouillard (FR); Pierre Andrivon, Liffre (FR); Philippe Bordes, Laille (FR); Edouard Francois, Bourg des Comptes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 2 days.

(21) Appl. No.: 15/544,753

(22) PCT Filed: Jan. 29, 2016

(86) PCT No.: PCT/EP2016/051868
§ 371 (c)(1),
(2) Date: Jul. 19, 2017

(87) PCT Pub. No.: WO2016/120420
PCT Pub. Date: Aug. 4, 2016

(65) Prior Publication Data
US 2017/0374390 A1    Dec. 28, 2017

(30) Foreign Application Priority Data

Jan. 30, 2015  (EP) .................................. 15305112

(51) Int. Cl.
*H04N 19/70*    (2014.01)
*H04N 19/98*    (2014.01)
(Continued)

(52) U.S. Cl.
CPC ........... *H04N 19/98* (2014.11); *H04N 19/122* (2014.11); *H04N 19/139* (2014.11);
(Continued)

(58) Field of Classification Search
CPC ...... H04N 19/98; H04N 19/70; H04N 19/122; H04N 19/139
See application file for complete search history.

(56) References Cited

U.S. PATENT DOCUMENTS 8,248,486 B1 *  8/2012  Ward .................... H04N 9/67
                                                          348/223.1
9,137,539 B2 *  9/2015  Kashiwagi .......... H04N 19/597
(Continued)

FOREIGN PATENT DOCUMENTS

WO    WO2009045636    4/2009
WO    WO2013103522    7/2013

OTHER PUBLICATIONS

Boyce et al.: Draft high efficiency video coding (HEVC) version 2, combined format range extensions (RExt), Scalability (SHVC), and multi-view (MV-HEVC) extensions, JCTVC-R1003_v6, Sapporo (JP), Jun. 2014.
(Continued)

*Primary Examiner* — Tsion B Owens
(74) *Attorney, Agent, or Firm* — Brian J. Dorini; Xiaoan Lu (57) ABSTRACT

To preserve backward compatibility with a non-HDR device or service, an HDR picture may be represented using a modulation value and an SDR picture representative of the HDR picture. The modulation value and the SDR picture can then be encoded into the bitstream. At the receiving side, the modulation value and the SDR picture can be decoded. Based on the modulation value, the SDR picture can be mapped to a decoded HDR picture. For a non-HDR device
(Continued)

or service, the modulation value information may be discarded and only the SDR picture is decoded. In particular, the modulation value may be implicitly signaled, using quad-tree representation information, intra coding information, inter partition mode information or motion vector residual information.

16 Claims, 8 Drawing Sheets

(51) Int. Cl.
*H04N 19/463* (2014.01)
*H04N 19/467* (2014.01)
*H04N 19/122* (2014.01)
*H04N 19/139* (2014.01)
*H04N 19/147* (2014.01)
*H04N 19/186* (2014.01)
*H04N 19/44* (2014.01)
*H04N 19/96* (2014.01)

(52) U.S. Cl.
CPC ......... *H04N 19/147* (2014.11); *H04N 19/186* (2014.11); *H04N 19/44* (2014.11); *H04N 19/463* (2014.11); *H04N 19/467* (2014.11); *H04N 19/70* (2014.11); *H04N 19/96* (2014.11)

(56) References Cited

U.S. PATENT DOCUMENTS

| | | | |
|---|---|---|---|
| 10,104,388 B2 * | 10/2018 | Ikeda | H04N 19/50 |
| 2009/0087110 A1 * | 4/2009 | Tourapis | H04N 19/176 382/238 |
| 2014/0341305 A1 * | 11/2014 | Qu | H04N 19/70 375/240.26 |
| 2015/0003749 A1 | 1/2015 | Kim et al. | |
| 2015/0103919 A1 * | 4/2015 | Hattori | H04N 19/124 375/240.25 |
| 2016/0353123 A1 * | 12/2016 | Ninan | H04N 5/2355 |

OTHER PUBLICATIONS

Segall, A, et al: "Tone mapping SEI",19. JVT Meeting; Mar. 31, 2006-Jul. 4, 2006;Geneva, CH; (Joint Video Team of ISO/IEC JTCl/SC29/WGII and ITU-T SG.16 ), No. JVT-S087, Apr. 1, 2006 (Apr. 1, 2006).

Yiqi Tew et al: "An Overview of Information Hiding in H.264/AVC Compressed Video",IEEE Transactions on Circuits and Systems for Video Technology,vol. 24, No. 2, Feb. 1, 2014 (Feb. 1, 2014), pp. 305-319.

Kapotas S K, et al: "Data Hiding in H. 264 Encoded Video Sequences",Multimedia Signal Processing, 2007. MMSP2007. IEEE 9th Workshop on, IEEE,Piscataway, NJ, USA, Oct. 1, 2007 (Oct. 1, 2007), pp. 373-376.

* cited by examiner

METHOD AND APPARATUS FOR ENCODING AND DECODING HIGH DYNAMIC RANGE (HDR) VIDEOS

This application claims the benefit, under 35 U.S.C. § 365 of International Application PCT/EP2016/051868, filed Jan. 29, 2016, which was published in accordance with PCT Article 21(2) on Aug. 4, 2016 in English and which claims the benefit of European application No. 15305112.3, filed Jan. 30, 2015.

TECHNICAL FIELD

This invention relates to a method and an apparatus for encoding and decoding a High Dynamic Range (HDR) video, and more particularly, to a method and an apparatus for conveying illumination information for an HDR video.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The dynamic range of luminance in a picture can be defined as a ratio between the highest luminance value of an image and the lowest luminance value of the image:

$$r = bright/dark \quad (1)$$

where "bright" denotes the highest luminance value of the image and "dark" denotes the lowest luminance value of the image. The dynamic range "r" is generally expressed as a number of power of two, called f-stops or equivalently stops. For instance, a ratio 1000 is about 10 f-stops, which is the typical dynamic range of standard non-HDR videos, also called SDR (Standard Dynamic Range) videos or equivalently LDR (Low Dynamic Range) videos.

Video signals used in the current consumer market are usually represented by 8 bits, and can handle up to 10 f-stops as shown below. An 8-bit video can represent a higher dynamic range than the obvious 8 f-stops if the video signal is not represented linearly but uses a non-linear dynamic compression curve. For instance, applying a BT.709 OETF (Opto-Electronic Transfer Function) curve on a linear light video signal, defined by the ITU-R and approximately equivalent to a gamma (power function) 1/2.2 to 8-bit video signals, would allow a dynamic range of more than 10 f-stops. In particular, the inverse OETF curve is represented as $$L = \begin{cases} \frac{V}{4.5} & 0 \leq V \leq 0.081 \\ \left(\frac{V+0.099}{1.099}\right)^{\frac{1}{0.45}} & 1 \geq V \geq 0.081 \end{cases} \quad (2)$$

on the input range $V \in [0,1]$. The peak at $V=1$ outputs the brightest value at $L=1$, and the lowest non-zero coded value $V=1/255$ outputs the darkest value at $L=0.00087$. Thus, the dynamic range for an 8-bit video signal using the OETF curve is $r=1/0.00087=1147$, roughly 10 f-stops. Since 8-bit video signals can have a dynamic range around 10 f-stops, an HDR video usually refers to a video with a dynamic range noticeably higher than 10 f-stops.

The exact dynamic range that an HDR video application supports may vary. For example, the SMPTE (Society of Motion Picture and Television Engineers) defines a Perceptual Quantizer EOTF (Electro-Optical Transfer Function) also known as PQ EOTF (defined in SMPTE ST. 2084) non-linear transfer curve, preferably coded on 12 bits, which may code the luminance on the range from 0.005 nits to 10000 nits (nit is a term referring to candela per square meter units or $cd/m^2$), leading to a ratio of 2 million or about 21 f-stops. Practically, first deployments of HDR at home may be expected to be TV sets providing not much more than a peak brightness of 1000 nits and a dynamic range of 15 f-stops, preferably on 10 bits data format if possible. This restricted HDR is also referred to as Extended Dynamic Range (EDR). Typically, an SDR video has a bit depth of 8 or 10 bits, and an HDR video has a bit depth of 10 bits and higher. For example, an SDR video can be a 4:2:0 Y'CbCr 10-bit video, and an HDR video can be a PQ OETF Y'CbCr 12-bit video.

SUMMARY

According to an aspect of the present principles, a method for generating a bitstream for a High Dynamic Range (HDR) picture is presented, comprising: determining a modulation value responsive to the HDR picture; and generating the bitstream including a Standard Dynamic Range (SDR) picture responsive to the HDR picture and the determined modulation value, wherein the determined modulation value is implicitly signaled in the bitstream.

According to another aspect of the present principles, a method for decoding a bitstream including a High Dynamic Range (HDR) picture is presented, comprising: determining a modulation value implicitly signaled in the bitstream; and determining the HDR picture responsive to the determined modulation value and a Standard Dynamic Range (SDR) picture included the bitstream.

According to another aspect of the present principles, an apparatus for generating a bitstream for a High Dynamic Range (HDR) picture is presented, comprising: a processor configured to determine a modulation value responsive to the HDR picture and generate the bitstream including a Standard Dynamic Range (SDR) picture responsive to the HDR picture and the determined modulation value, wherein the determined modulation value is implicitly signaled in the bitstream; and a communication interface configured to output the bitstream.

According to another aspect of the present principles, an apparatus for decoding a bitstream including a High Dynamic Range (HDR) picture is presented, comprising: a communication interface configured to access the bitstream; and a decoder configured to determine a modulation value implicitly signaled in the bitstream and determine the HDR picture responsive to the determined modulation value and a Standard Dynamic Range (SDR) picture included the bitstream.

DETAILED DESCRIPTION

Many video coding standards and video codecs have been developed for SDR videos, for example, but not limited to, MPEG-2, H.264/AVC, H.265/HEVC standards and codecs that are conformed to these standards. In the present application, the various encoders, decoders and devices that support SDR videos, but not HDR videos, are referred to as SDR (or non-HDR) encoders, decoders and devices, respectively, and the various encoders, decoders and devices that support HDR videos are referred to as HDR encoders, decoders and devices, respectively. In the present application, we use the terms "frame" and "picture" interchangeably to identify a sample array, often containing values for multiple components.

When handling HDR videos, for example, encoding or distributing HDR videos, it is desirable that the system can also provide backward compatibility to the devices or services that only support SDR videos. In the present application, we call a system that handles HDR videos with backward compatibility with SDR videos as an SDR/HDR system. In particular, with backward compatibility, an SDR decoder within an SDR/HDR system should be able to generate an associated SDR video representative of the HDR video, but with a more limited dynamic range than the HDR video.

A straightforward solution of designing an SDR/HDR distribution system could be simulcasting both SDR and HDR video streams on the distribution infrastructure, which virtually doubles the needed bandwidth compared to an infrastructure distributing only the SDR videos. When the bandwidth is limited, the SDR/HDR distribution system usually should take the bandwidth consumption into consideration.

Another solution is to reduce the dynamic range of an HDR video into a limited number of bits (for example, 10 bits) using a non-linear function, compress the reduced HDR video (for example, using the Main 10 profile of H.265/HEVC), and distribute the compressed video stream. Exemplary non-linear functions for reducing the dynamic range of an HDR video include PQ OETF, gamma compensation curves and BT.709/BT.2020 OETF ITU-R curves. More generally, an HDR video may be converted to an SDR video using an "absolute" non-linear mapping curve, where "absolute" should be understood as the mapped SDR value corresponds to a unique HDR input brightness, i.e., the curve is not adapted to the content. Using an "absolute" mapping curve, the reduced HDR video usually does not provide a good viewability (i.e., preserve the overall perceived brightness (i.e., dark vs. bright scenes) and perceived colors (for instance, preservation of hues and perceived saturation, also called colorfulness) of the corresponding HDR video) as an SDR video, and thus this solution lacks backward compatibility. In addition, the compression performance is usually poor.

In view of the drawbacks in the existing solutions, we consider that the following constraints should generally be taken into account when designing an SDR/HDR distribution system with backward compatibility with SDR devices and services:

Minimizing the bitrate of the SDR/HDR distribution system;

Ensuring good quality of both SDR and HDR decoded videos;

Providing backward compatibility such that the SDR video is decodable and viewable for users only having access to SDR decoders; and Providing good viewability for the decoded SDR video, in particular, the SDR video should preserve the overall perceived brightness (i.e., dark vs. bright scenes) and perceived colors (for instance, preservation of hues and perceived saturation, also called colorfulness) of the corresponding HDR video.

Figure 1:
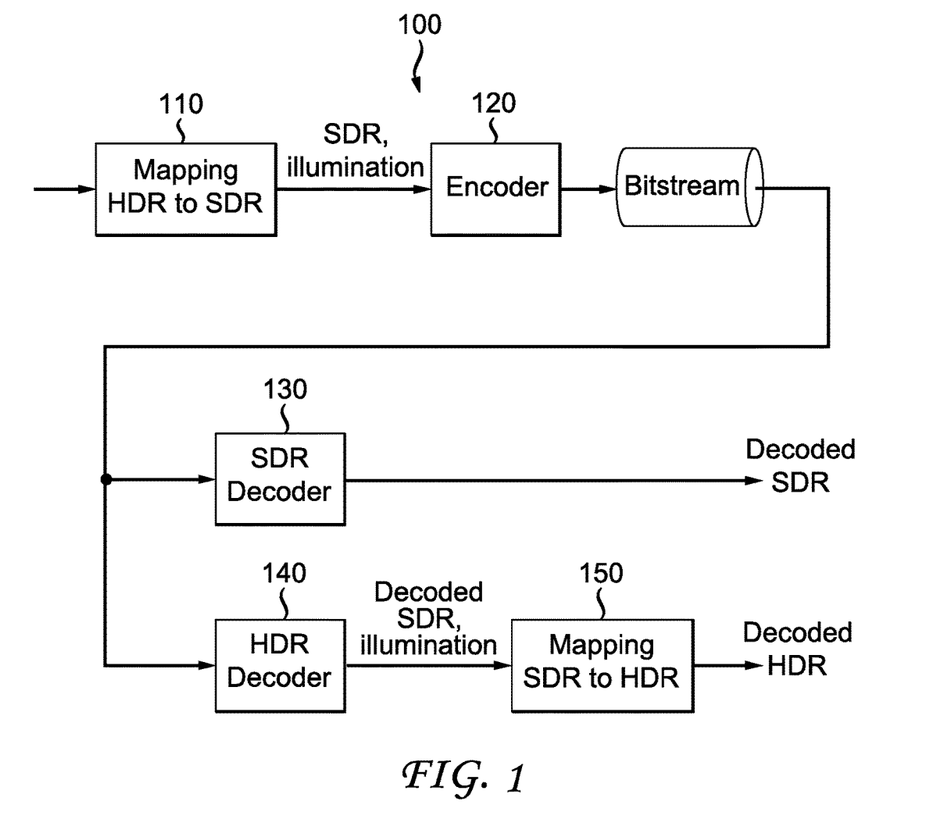
FIG. 1 illustrates an exemplary SDR/HDR distribution workflow.

FIG. 1 illustrates an exemplary SDR/HDR distribution workflow 100 that transmits HDR videos while providing backward compatibility with SDR decoders. In workflow 100, an HDR frame is processed to obtain a corresponding SDR frame and illumination information (110). For example, an illumination frame (also called illumination map or backlight frame/image) can be determined from the HDR frame to represent the backlight of the HDR content.

Here, the term backlight is used by analogy with TV sets made of a color panel, such as an LCD panel, and a rear illumination apparatus, such as an LED array. The rear apparatus, usually generating white light, is used to illuminate the color panel to provide more brightness to the TV. As a consequence, the luminance of the TV is the product of the luminance of rear illuminator and the luminance of the color panel. This rear illuminator is often called "backlight."

Given the illumination frame, a residual frame (i.e., the SDR frame) is then obtained by dividing the HDR frame by the illumination map. Referring back to the analogy where HDR is equal to SDR times backlight, the SDR frame could be understood as the response of the (SDR) color panel. Subsequently, both the illumination information and the SDR frame are encoded (120) into a bitstream, using, for example, but not limited to, an H.264/AVC or H.265/HEVC encoder.

When encoding an HDR frame using such an approach, the encoder encodes two components: an SDR frame (the residual frame), which may be a viewable frame, and associated HDR illumination information. These two components may have different formats from each other, for example, the associated illumination information may be monochrome and the SDR frame may use a Y'CbCr or an RGB format. Also, each component can have different formats (for example, Y'CbCr, YUV, RGB and XYZ).

At the decoding side, the SDR frame can be decoded using an SDR decoder for backward compatibility (130), which provides a decoded SDR video as output. Alternatively, both the SDR frame and the illumination information can be decoded using an HDR decoder (140). Using the decoded SDR frame and illumination information, the SDR frame can be mapped back to a decoded HDR frame (150). The mapping from SDR to HDR (150) can also be performed by the HDR decoder (140).

When the illumination information is represented by an illumination map, different methods can be used to encode the illumination information and the SDR frame. In one example, the encoder may choose a frame packing approach, where the illumination map and the SDR frame are placed together to form a single picture before encoding.

In another example, the encoder may use auxiliary picture coding, which may require for instance an SHVC (scalable HEVC) framework even if only a single layer of coding is used, i.e., no scalable layer is used. Unlike H.264/AVC, here, the SHVC standard is needed only to define the auxiliary picture syntax as such pictures are not defined in the non-scalable HEVC standard. Generally, auxiliary pictures are defined in addition to the so-called "primary coded pictures," which correspond to the main video of the content. In one embodiment, the illumination map is encoded as an auxiliary picture, while the SDR frame is conveyed as a corresponding primary coded picture.

In yet another example, the encoder decouples the input HDR signal format from the output SDR signal formats, and conveys the indication of these two signal formats using the VUI (Video Usability Information) and an accompanying SEI (Supplemental Enhancement Information) message containing information needed for reconstruction of the output HDR signal. Specifically, SEI message embeds PSF (Point Spread Function) model, which needs an extra processing step to reconstruct the illumination map from the PSF model.

In the above, we discussed splitting an HDR video into two components, namely, an SDR video and an associated illumination map, in order to distribute the HDR video while preserving backward compatibility. In another embodiment, we may determine only a single modulation value (also called illumination value or backlight value, denoted as Ba), rather than an illumination map, for a whole frame. Based on the single modulation value, a corresponding SDR frame may be obtained for an HDR frame, for example, using a non-linear mapping function that basically performs normalization by the modulation value and a logarithm function. In one embodiment, the SDR luminance data may be determined through a set of mappings $L_{SDR}=g(Ba, Y_{HDR})$ that depends on the modulation value Ba and the input HDR luminance $Y_{HDR}$.

The mappings that depend on illumination information are "relative" in the sense that several input HDR sample values can correspond to a unique SDR mapped value depending on the value Ba. On the decoder side, the de-mapping from SDR to HDR is performed using the received Ba value and the inverse functions $g^{-1}(Ba, L_{SDR})$. Note that in the present application, the mapping process from the SDR to HDR video is also sometimes referred to as "de-mapping".

Referring back to FIG. 1 as an exemplary SDR/HDR distribution workflow, if a single modulation value is used, the workflow 100 would process an HDR frame to obtain the single modulation value as the illumination information and an SDR frame based on the single modulation value at 110.

Figure 2:
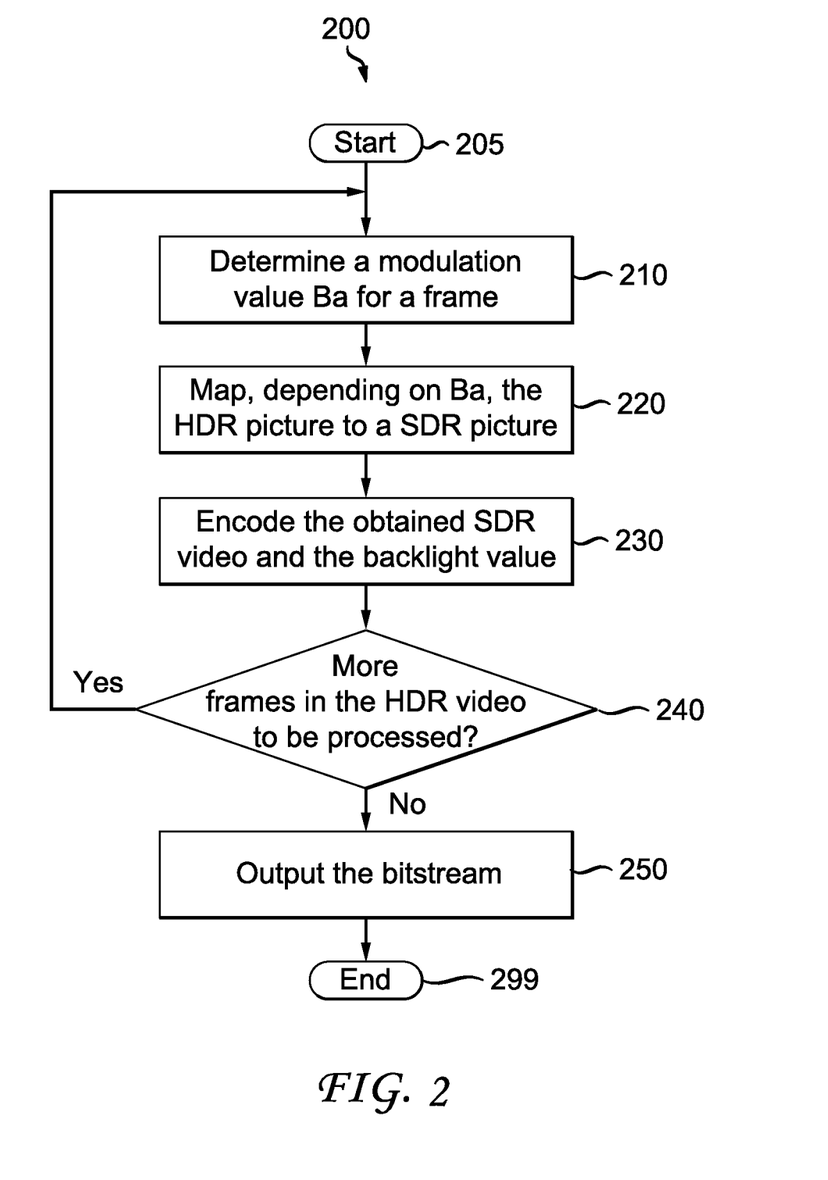
FIG. 2 illustrate an exemplary method for encoding an HDR video according to an embodiment of the present principles.

FIG. 2 illustrates an exemplary method 200 for encoding an HDR video according to the present principles. Method 200 starts at step 205. At step 210, it determines a modulation value Ba for an individual frame in the HDR video. Different methods can be used to calculate the modulation value, for example, but not limited to, using an average, median, minimum or maximum value of the HDR luminance. These operations may be performed in the linear HDR luminance domain $Y_{HDR,lin}$ or in a non-linear domain like $\ln(Y_{HDR,lin})$ or $Y_{HDR,lin}^{\gamma}$ with $\gamma<1$.

At step 220, based on the modulation value Ba, it maps the HDR picture onto an SDR picture represented in a format compatible with an SDR encoder. At step 230, it encodes the obtained SDR picture and the modulation value Ba. At step 240, it checks whether more frames in the HDR video need to be processed. If yes, it returns control to step 210; otherwise, it outputs the bitstream at step 250. Method 200 ends at step 299.

Figure 3:
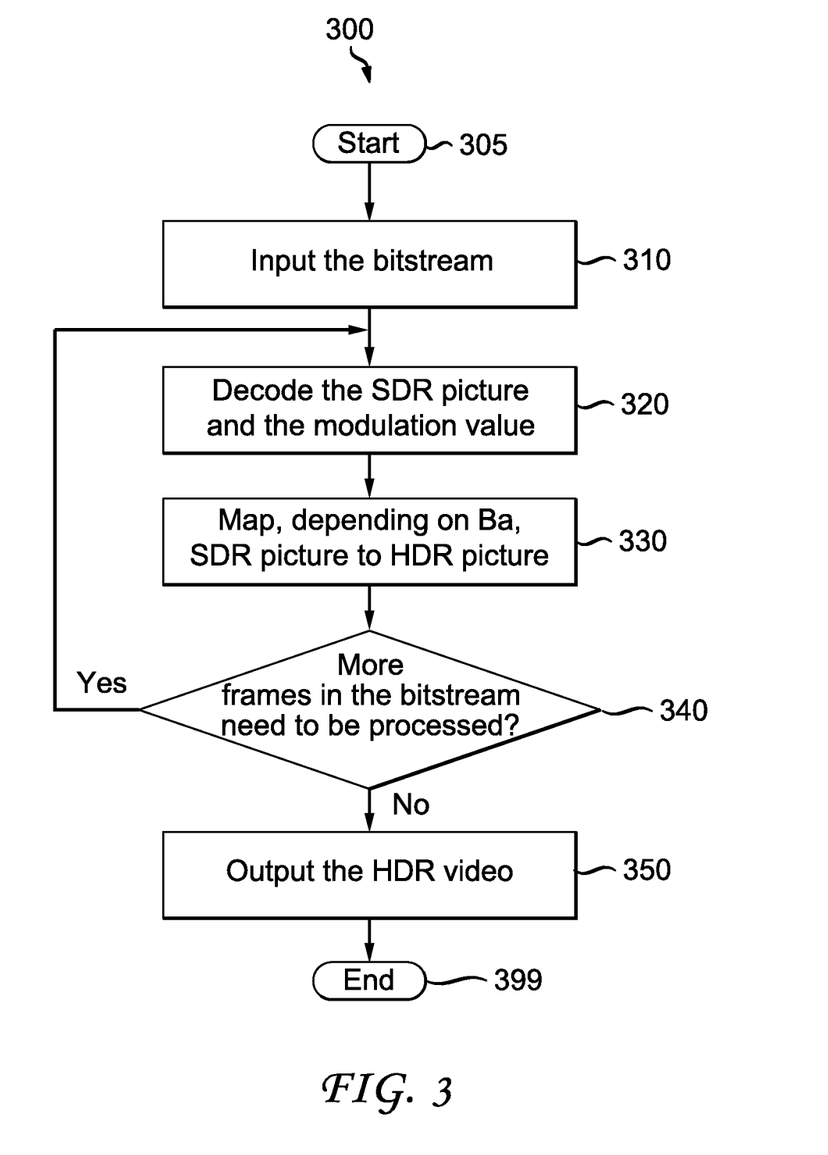
FIG. 3 illustrate an exemplary method for decoding an HDR video according to an embodiment of the present principles.

FIG. 3 illustrate an exemplary method 300 for decoding an HDR video according to the present principles. Method 300 starts at step 305. At step 310, it accesses a bitstream, for example, one generated according to method 200. At step 320, it decodes the bitstream to obtain a decoded SDR picture and a modulation value for the picture. At step 330, the decoded SDR picture is mapped to an HDR picture based on the modulation value. The de-mapping (i.e., SDR-to-HDR mapping) process used at step 330 should be the inverse of the HDR-to-SDR mapping processing (for example, the mapping used at step 220), used at the encoder side. At step 340, it checks whether more frames in the bitstream need to be processed. If yes, it returns control to step 320; otherwise, it outputs the recovered HDR video at step 350. Method 300 ends at step 399.

When the HDR bitstream is to be decoded by an SDR decoder, the modulation value could be discarded and only the SDR video would be decoded from the bitstream.

The steps in method 200 may proceed at a different order from what is shown in FIG. 2, for example, step 240 may be performed before step 230. That is, all frames in the HDR video would be processed to get the modulation values for all frames and the associated SDR video before they are encoded. Similarly, the steps in method 300 may proceed at a different order from what is shown in FIG. 3, for example, step 340 may be performed before step 330. That is, modulation values for all frames and an SDR video would be decoded before the SDR to HDR mapping.

In one embodiment, the following mapping function can be used to reduce the dynamic range and map an HDR picture to an SDR picture:

$$L_{SDR}=g(Ba, Y_{HDR})=M_{SDR}f(Y_{HDR}/Ba)/f(P_{HDR}/Ba) \qquad (3)$$

where $P_{HDR}$ is the peak luminance of the HDR workflow, $M_{SDR}$ is the maximum SDR luma or luminance value, $L_{SDR}$ is the luminance of the SDR picture, $Y_{HDR}$ is the luminance of the HDR picture, and f( ) is a function. In one example, f can be a Slog function of the form $$f(z)=a \ln(b+z)+c \text{ with } f(0)=0. \qquad (4)$$

Figure 4:
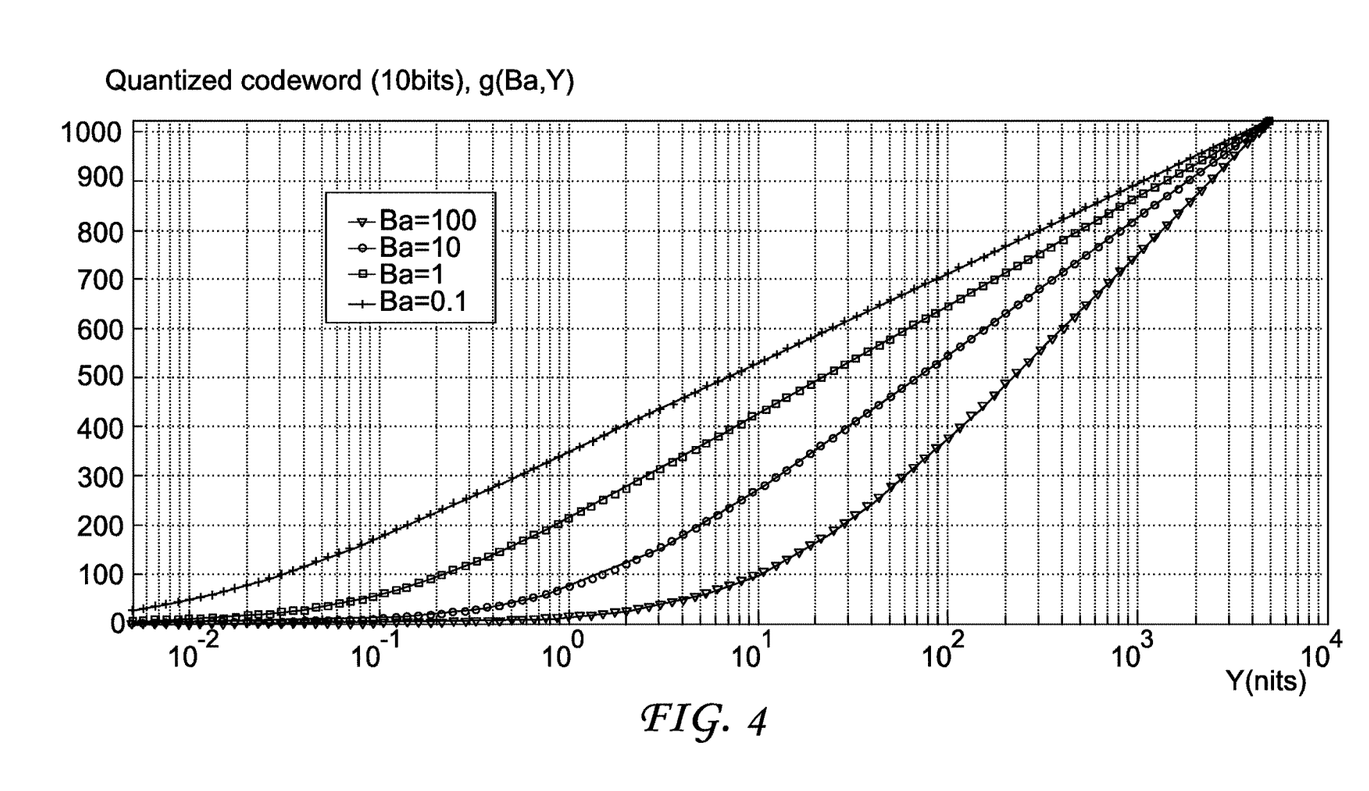
FIG. 4 illustrates pictorial examples of functions mapping HDR luminance to SDR luminance according to an embodiment of the present principles.

Examples of mapping functions $g(Ba, Y_{HDR})$ defined by f as a Slog function are shown in FIG. 4 for a peak $P_{HDR}$=5000 nits and a mapping to an SDR video of 10 bits, i.e., $M_{SDR}$=1023.

The inverse process (i.e., SDR to HDR mapping) at the decoder side can then be derived as:

$$Y_{HDR}=Ba \times f^{-1}(f(P_{HDR}/Ba)L_{SDR}/M_{SDR}) \qquad (5)$$

where, in the case of the Slog function f, its inverse $f^{-1}$ is $$f^{-1}(z)=\exp((z-c)/a)-b. \qquad (6)$$

Given the dynamic reduction curve (i.e., HDR to SDR mapping), an HDR picture can be reduced to an SDR picture by the following steps:
1. Step 1: luminance dynamic range reduction. Reduction of the HDR luminance $Y_{HDR}$ dynamic range to get luminance $L_{SDR}$, for example at 10 bits, can be performed as $L_{SDR}=g(Ba,Y_{HDR})$;
2. Step 2: construction of two chroma components U (or Cb) and V (or Cr). Similarly, HDR chroma components can be reduced using $U_{SDR}=g(Ba_U,U_{HDR})$ and $V_{SDR}=g(Ba_V,V_{HDR})$, where $Ba_U=Ba_V=Ba$ in case of a monochrome modulation value. This completes the mapping process and the SDR video has three components: $L_{SDR}$, $U_{SDR}$ and $V_{SDR}$. In another embodiment, one can reduce the $RGB_{HDR}$ components by $R_{SDR}=g(Ba,R_{HDR})$, $G_{SDR}=g(Ba,G_{HDR})$, $B_{SDR}=g(Ba,B_{HDR})$ and deduce $UV_{SDR}$ as linear combinations of $RGB_{HDR}$, similarly to what is done in the standard SDR workflow by using the BT.709 or BT.2020 RGB to YUV matrices.

In the above, various numeric values are discussed in different operations. These numeric values are for exemplary purposes and can be adjusted based on applications. For example, when the SDR video was discussed above mainly as a 10-bit video, the SDR video can also take other dynamic ranges or bit depths. The techniques according to the present principles are also not limited to the color format of the HDR video or SDR video. For example, when the mapping process was mainly discussed above using the YUV format, the mapping can also be applied to other color formats, for example, but not limited to, YCbCr, RGB and XYZ formats.

Modulation Value Signaling

To convey the modulation value, the modulation value is converted to a binary representation Ba_bin through a conversion method. This conversion may take the form of a simple scalar quantization of the Ba value, followed by a unary binary representation of the quantized value. This conversion may also consist in applying a logarithm function followed by a quantization step.

In the following, we describe different methods that can be used to signal the modulation value. The techniques according to the present principles can be used in HDR video distribution for example, using H.265/HEVC, H.264/AVC or any other video codecs, for broadcast and OTT (Over The Top), which is backward compatible with SDR.

Implicit Signaling

In one embodiment, the modulation value information may be "hidden" in a coded stream. Consequently, the signaling of modulation value information does not need new syntax elements or metadata.

In the following, we use the HEVC standard to illustrate how to embed the modulation value information without introducing new syntax elements. The embedding or hiding techniques can also be applied to other video compression standards.

Using modulation value hiding, the SDR/HDR distribution may proceed as follows at the encoder side:
(1) determine a modulation value Ba for each frame;
(2) optionally quantize the Ba value to represent Ba using a binary string at a reduced number of bits;
(3) map, depending on Ba, each HDR picture onto an SDR picture represented in a format compatible with an SDR encoder, for example, 4:2:0 YUV 10 bits for UHDTV. If Ba value is quantized, then the mapping will be based on the quantized Ba;
(4) encode the obtained SDR video by using the SDR encoder, where at least one coded syntax element is used to encode both the SDR picture in conformance with a current standard, and also to encode a binary string representative of the Ba value; and
(5) distribute the bitstream of the obtained encoded SDR video.

At the decoder side, the HDR video can be decoded from a bitstream as follows:
(1) decode the bitstream to retrieve the hidden modulation value Ba for each frame and a decoded SDR video; and
(2) de-map the SDR video to an HDR video by applying the inverse of the mapping from HDR to SDR.

If a non-HDR decoder is used to decode the bitstream, then the decoder may not even know that there is a hidden modulation value in the bitstream and the modulation value information is discarded when decoding the SDR video.

In one embodiment, it is possible to hide the Ba value in the quad-tree representation information used to represent the HEVC Coding Units and Transform Units. This could be performed by directly coding the bits representing Ba as transform tree splitting flags in the HEVC bitstream.

Figure 10:
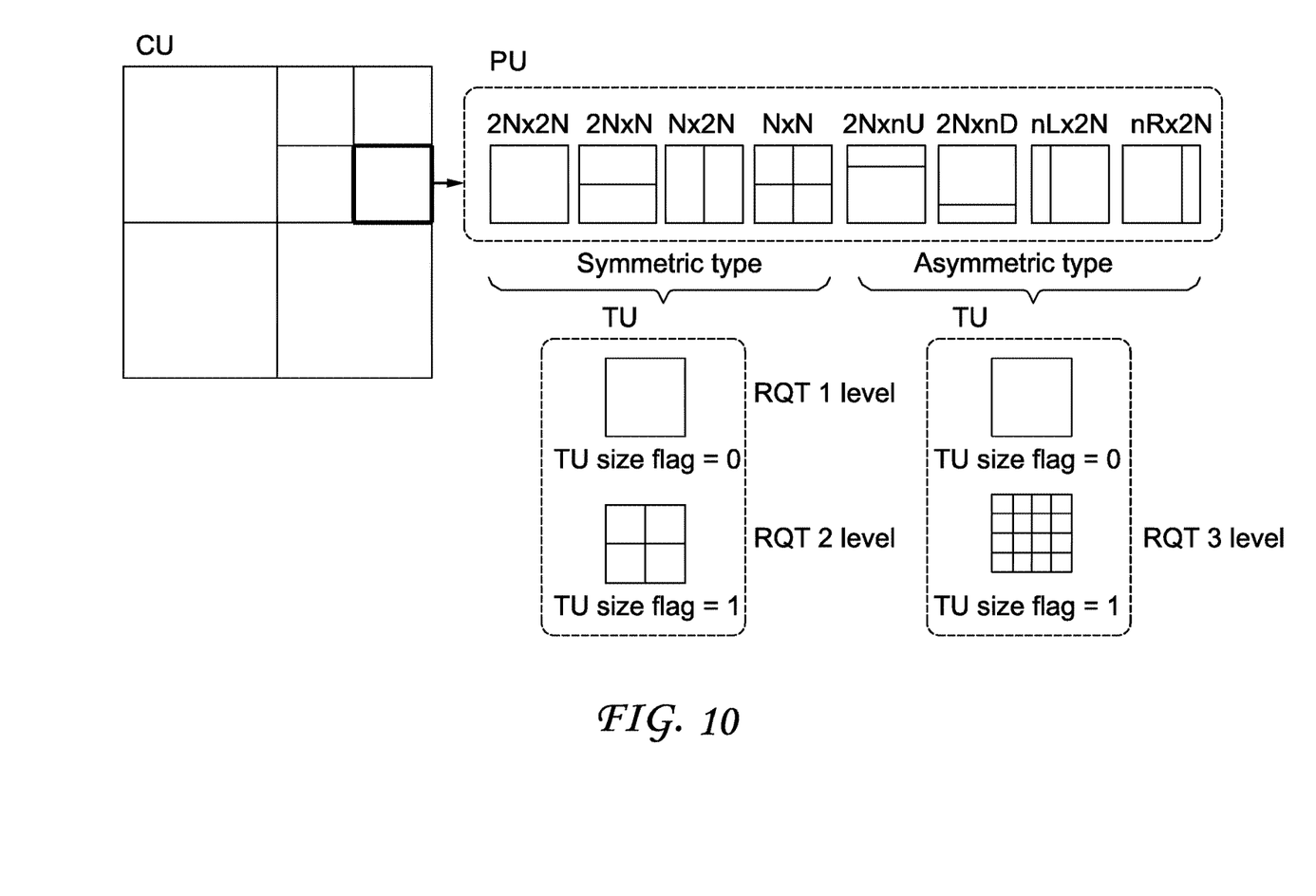

Using H.265/HEVC as an example, we illustrate in FIG. 10 an exemplary quad-tree representation, where a coding tree unit (CTU) is split into coding units and transform units. As illustrated in FIG. 10, a CTU is first divided into Coding Units (CU), in a quad-tree way. The HEVC syntax associated with a given CU indicates, among others, the coding mode (Intra, Inter, Skip), the partition mode used to divide a CU into different Prediction Units (PU), and the Transform Tree depth used to further split the CU into transform units. Each CU is assigned a so-called partition mode, which indicates the way a CU is divided into one or more Prediction Unit. Each Prediction Unit is given a set of Intra or Inter Prediction parameters (e.g., angular prediction direction for an Intra CU, reference picture(s) and motion vector(s) for an Inter CU). Furthermore, each CU is also divided into a so-called transform tree. A transform tree consists in a quad-tree representation of the transformed blocks contained in a CU. As shown in FIG. 10, the transform tree (called RQT in FIG. 10) may have several depth levels, since transform sizes from 4×4 up to 32×32 are supported by HEVC.

The hidden Ba value, which typically occupies between 0 and 17 bits of information at most, should usually be fully contained within the compressed representation of the first coding tree unit (CTU), also called LCU (Largest Coding Unit) of each coded picture. Thus, as soon as an H.265/HEVC video decoder has processed the first LCU, it can derive the modulation value and therefore perform the HDR reconstruction of the LCU. This allows pipelining the HDR reconstruction process with the H.265/HEVC decoding process in a very efficient way. The decoder is able to fully process one LCU before starting processing the following ones.

Figure 8A:
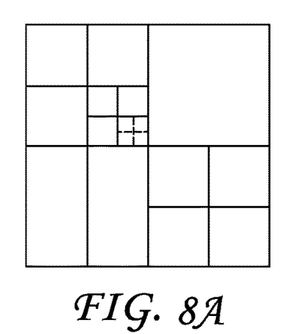
FIG. 8A illustrates an exemplary first LCU (Largest Coding Unit) of a picture to be encoded, which has a typical size of 64×64 pixels.

FIG. 8A shows an exemplary first LCU of a picture to be encoded, which has a typical size of 64×64 pixels. According to the quad-tree structure obtained by a rate distortion optimization process, the LCU is divided into Coding Units (CU) of different sizes.

Figure 8B:
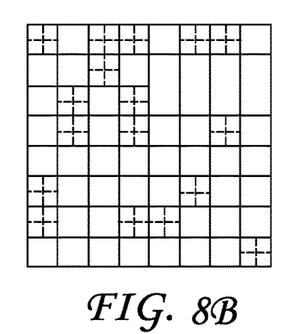
FIG. 8B illustrates an exemplary embodiment of signaling the bits of the binary representation Ba_bin in an implicit way according to an embodiment of the present principles.

FIG. 8B illustrates an exemplary embodiment of signaling the bits of the binary representation Ba_bin in an implicit way. In one embodiment, we force the LCU quad-tree representation to only contain CUs of size 8×8. For each Coding Unit, either a 4×4 transform or an 8×8 transform may be used, based on the binary representation Ba_bin. For example, to embed the binary representation Ba_bin, an 8×8 transform size corresponds to a bit equal to 0 in the Ba_bin binary string, and a 4×4 transform corresponds to a bit equal to 1. Consequently, the first LCU of the picture, which would have been encoded as shown in FIG. 8A, is actually encoded with the forced structure as shown in FIG. 8B.

Note that an LCU is typically of a size of 64×64 pixels, hence contains 64 Coding Units with size 8×8, as shown in FIG. 8B. Therefore, a binary string of 64 bits can be embedded using the proposed technique, which is sufficient for the binary string (for example, at 17 bits) we want to transmit for Ba_bin. According to one embodiment, once the decoder has decoded a sufficient number of bits (e.g., 17) for the Ba_bin string, then the decoding of these element completes. Similarly, on the encoder side, once a sufficient number of bits has been inserted into the H.265/HEVC bitstream to signal Ba_bin, then the encoder stops imposing the above constraint on the coding parameter decision process.

Figure 9:
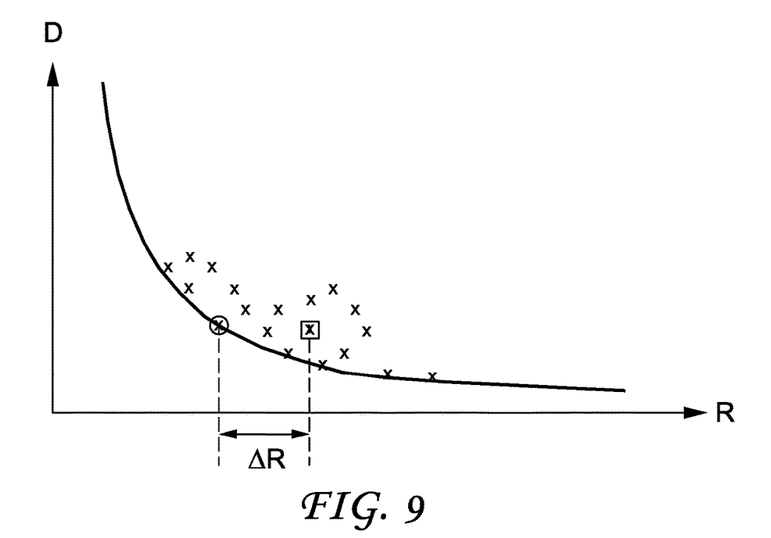
FIG. 9 is an exemplary pictorial example depicting the rate distortion performance of the H.265/HEVC with and without the proposed technique.

Using this approach, the rate distortion performance of the H.265/HEVC coding may be affected slightly, with regards to the first LCU of the picture, as illustrated in an exemplary rate distortion curve in FIG. 9, where the theoretical rate distortion function associated with the first LCU of the picture is drawn (solid line), together with the rate distortion points that can be achieved with an H.265/HEVC encoder with various coding parameters (CU sizes, TU sizes, prediction mode). The theoretical rate distortion function may be calculated based on the minimum achievable rate under the constraint of a maximum distortion level.

As can be seen from FIG. 9, the rate distortion point that would have been chosen by the encoder without the proposed constraint (cross embedded in a circle) lies near the convex hull of all achievable points, which corresponds to the theoretical rate distortion function. Here, as we impose constraints on the quad-tree representation of an LCU, the coding of the first LCU becomes sub-optimal. This is illustrated by the rate distortion point (cross embedded in a square) that is finally used for the coding of the LCU. The rate difference ΔR between the optimal rate distortion point (cross embedded in a circle) and the sub-optimal point (cross embedded in a square) corresponds to the overhead associated with hiding the Ba_bin information into the bitstream. Hence it corresponds to the amount of bits which is incurred for coding the Ba_bin element, according to the considered embodiment.

As discussed above, the rate distortion performance of the H.265/HEVC coding may be affected slightly, with regards to the first LCU of the picture. However, since the quantization parameter are unchanged compared to an H.265/HEVC encoder without Ba_bin embedding, the pixel domain distortion in the concerned LCU is impacted in a quite limited way. Also, since the process only applies to the first LCU, the overall rate distortion performance of the considered SDR/HDR coding system may be negligible for a whole picture.

Other syntax elements of the H.265/HEVC standard may be used to embed the Ba_bin information. For example, the signaling of the intra prediction may be adapted to insert Ba_bin information in it. This may be done by forcing a maximum CU size, as in the previous embodiment, in order to ensure a minimum number of Coding Units in the considered LCU. Then for Intra Coding Unit, the value of the prev_intra_luma_pred_flag may be forced so as to indicate the value of a bit in the Ba_bin binary string.

In H.265/HEVC, the prev_intra_luma_pred_flag syntax element indicates whether one of the "most probable intra prediction modes" is used for the intra prediction of a current prediction unit, inside an Intra CU. If equal to 1, this means the intra prediction direction is derived from a neighboring intra predicted prediction unit. Otherwise, an intra prediction direction out of these most probable intra directions is used for current Intra predicted prediction unit.

Moreover, for Inter Coding Units, some Ba_bin value may be contained in the partition mode, which indicates the prediction unit shape. Additionally, if motion vector residual information is present, this information may also be used to indicate values in the Ba_bin. The motion vector residual information, or motion vector difference information, specifies the differences between a motion vector's components of a current inter predicted prediction unit, and the components of the motion vector used to predict the motion vector of current prediction unit.

When the modulation value information is "hidden" in the bitstream as discussed above, an H.265/HEVC decoder not implementing the proposed techniques can decode the SDR video, without even realizing that the modulation values are embedded in the bitstream. Advantageously, the coded modulation value is ignored by such H.265/HEVC decoders, and thus the workflow can preserve full backward compatibility. Moreover, the proposed approach also has low computation complexity and only incurs a negligible extra bandwidth requirement. Since the modulation value information is embedded within the picture, it is also easy to synchronize the picture information and the modulation value information.

The modulation value embedding and retrieval as discussed above could be used at encoding and decoding HDR videos, for example, at the encoding at step 230 of method 200, and at step 320 of method 300.

In one embodiment, an SEI message can be used to indicate the presence of implicitly signaled Ba values for the current coded picture. This typically takes the form of an minimum SEI message made of only a payload type syntax element (e.g., as described in section 7.3.5 of document JCTVC-R1013_v6, draft version of HEVC edition 2). For example, this SEI payload type contains a particular value that indicates that associated current coded picture in the sequence contains some hidden information that can be used to retrieve a single-value modulation information (e.g., payloadType=181).

Different from a method that signals the modulation value explicitly, the SEI message here serves only to indicate the presence of the modulation value Ba related hidden information in the current coded picture, while in the explicit mode, an SEI message with the Ba value is transmitted.

An exemplary syntax of such minimal SEI message is described in TABLE 1.

TABLE 1

| Modulation value presence SEI message syntax | |
| --- | --- |
| modulation_value_present(payloadSize) { | Descriptor |
| } | |

Semantics:

modulation_value_present: The modulation_value_present SEI message indicates that the current coded picture contains a modulation value hidden information in the bitstream, as shown in Table 2.

TABLE 2

| SEI message | Persistence scope |
|---|---|
| | Persistence scope of SEI message |
| modulation value presence | The access unit containing the SEI message |

According to another embodiment the modulation_value_present SEI message is persistent for several consecutive pictures. This persistence scope may be informatively described in a table (such as table F.4 or D.1 of JCTVC-R1013_v6), as shown in TABLE 3 and TABLE 4.

TABLE 3

| SEI message | Persistence scope |
|---|---|
| | Persistence scope of SEI message - variant 1 |
| modulation value presence | The CVS containing the SEI message |

TABLE 4

| SEI message | Persistence scope |
|---|---|
| | Persistence scope of SEI message - variant 2 |
| modulation value presence | One or more pictures associated with the access unit containing the SEI message |

The syntax of modulation_value_present SEI message may be as follows in order to explicitly manage temporal persistence of modulation value presence (hidden in the bitstream), as shown in TABLE 5 and TABLE 6.

TABLE 5

| SEI message | Persistence scope |
|---|---|
| | Persistence scope of SEI message - variant 3 |
| modulation value presence | Specified by the syntax of the SEI message |

TABLE 6

| Modulation value presence SEI message syntax - variant | |
|---|---|
| modulation_value_present( payloadSize ) { | Descriptor |
|   modulation_value_cancel_flag | u(1) |
|   if( !modulation_value_cancel_flag ) { | |
|     modulation_value_present_flag | u(1) |
|     modulation_value_persistence_flag | u(1) |
|   } | |
| } | |

Semantics modulation_value_cancel_flag equal to 1 indicates that the modulation_value_present SEI message cancels the persistence of any previous modulation_value_present SEI message in the output order that applies to the current layer. modulation_value_cancel_flag equal to 0 indicates that modulation_value_present SEI follows.

modulation_value_persistence_flag specifies the persistence of the modulation_value_present SEI message for the current layer. modulation_value_persistence_flag equal to 0 specifies that the modulation_value_present applies to the current picture only.

Let picA be the current picture. modulation_value_persistence_flag equal to 1 specifies that the modulation value presence persists for the current layer in the output order until either of the following conditions is true:

A new CLVS of the current layer begins.

The bitstream ends.

A picture picB in the current layer in an access unit containing a modulation_value_present SEI message applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

modulation_value_present_flag equal to 1 specifies that modulation value is present and hidden in the picture coded bitstream. modulation_value_present_flag equal to 0 specifies that modulation value is not present in the picture coded bitstream. When modulation_value_present_flag is not present, modulation_value_present_flag is inferred equal to 0.

In another embodiment, modulation_value_present(payloadSize) as shown in TABLE 6 may be defined without modulation_value_present_flag syntax element.

According to another embodiment, the implicit signaling technique described above is employed in order to encode several values instead of a Ba value as described above. These several values are adapted to the representation of an illumination map (also called modulation picture or backlight picture), which is not necessarily constant over the whole picture area. In that case, a series of coefficients are encoded in the bitstream, in order for the decoder side to reconstruct an illumination map. Typically, this takes the form of some weighting coefficients, which are used to compute a linear combination of 2D spatial function (called shape functions). This linear combination computed by the decoder, may correspond to the illumination map used thereafter to perform SDR-to-HDR mapping.

According to another embodiment, the illumination map may be defined with a constant value for a given spatial picture area, for example, corresponding to a tile or a slice of the H.265/HEVC coded picture. In that case, one Ba value may be implicitly signaled for each picture area in the considered picture. Therefore, a Ba_bin representation is obtained for each picture area, and is hidden in the first LCU of the corresponding picture area, according to one or more of the hiding techniques previously introduced.

When multiple Ba related values are to be inserted in the bitstream, the hidden modulation values may be contained not only in the first LCU of an H.265/HEVC compressed picture, but may also be hidden in subsequent LCUs in the picture. The same H.265/HEVC syntax element modification techniques (quad-tree representation, intra prediction mode and motion vectors) can be used to hide these multiple coefficients.

Figure 5:
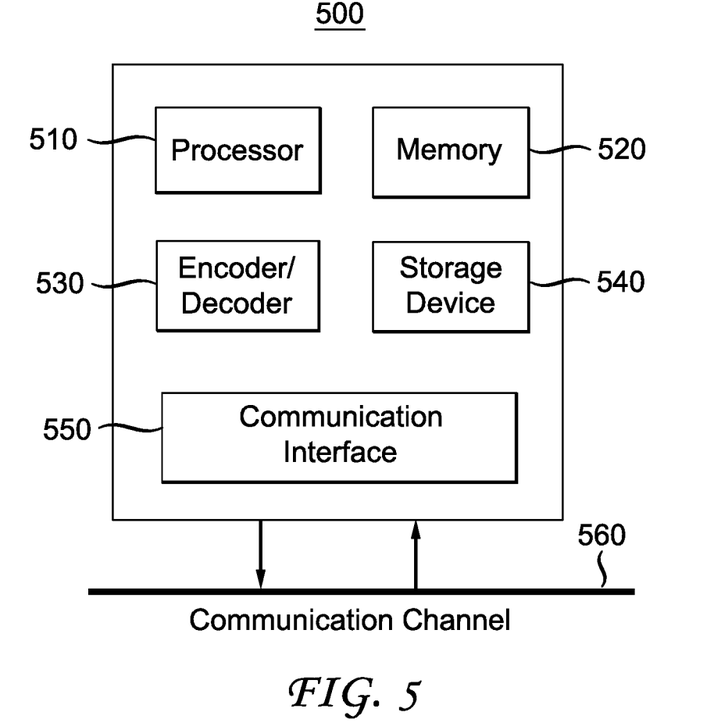
FIG. 5 illustrates a block diagram depicting an exemplary system in which various aspects of the exemplary embodiments of the present principles may be implemented.

FIG. 5 illustrates a block diagram of an exemplary system in which various aspects of the exemplary embodiments of the present principles may be implemented. System 500 may be embodied as a device including the various components described below and is configured to perform the processes described above. Examples of such devices, include, but are not limited to, personal computers, laptop computers, smartphones, tablet computers, digital multimedia set top boxes, digital television receivers, personal video recording systems, connected home appliances, and servers. System 500 may be communicatively coupled to other similar systems, and to a display via a communication channel as shown in FIG. 5 and as known by those skilled in the art to implement the exemplary video system described above.

The system 500 may include at least one processor 510 configured to execute instructions loaded therein for implementing the various processes as discussed above. Processor 510 may include embedded memory, input output interface and various other circuitries as known in the art. The system 500 may also include at least one memory 520 (e.g., a volatile memory device, a non-volatile memory device). System 500 may additionally include a storage device 540, which may include non-volatile memory, including, but not limited to, EEPROM, ROM, PROM, RAM, DRAM, SRAM, flash, magnetic disk drive, and/or optical disk drive. The storage device 540 may comprise an internal storage device, an attached storage device and/or a network accessible storage device, as non-limiting examples. System 500 may also include an encoder/decoder module 530 configured to process data to provide an encoded video or decoded video.

Encoder/decoder module 530 represents the module(s) that may be included in a device to perform the encoding and/or decoding functions. As is known, a device may include one or both of the encoding and decoding modules. Additionally, encoder/decoder module 530 may be implemented as a separate element of system 500 or may be incorporated within processors 510 as a combination of hardware and software as known to those skilled in the art.

Program code to be loaded onto processors 510 to perform the various processes described hereinabove may be stored in storage device 540 and subsequently loaded onto memory 520 for execution by processors 510. In accordance with the exemplary embodiments of the present principles, one or more of the processor(s) 510, memory 520, storage device 540 and encoder/decoder module 530 may store one or more of the various items during the performance of the processes discussed herein above, including, but not limited to the modulation value, the SDR video, the HDR video, equations, formula, matrices, variables, operations, and operational logic.

The system 500 may also include communication interface 550 that enables communication with other devices via communication channel 560. The communication interface 550 may include, but is not limited to a transceiver configured to transmit and receive data from communication channel 560. The communication interface may include, but is not limited to, a modem or network card and the communication channel may be implemented within a wired and/or wireless medium. The various components of system 500 may be connected or communicatively coupled together using various suitable connections, including, but not limited to internal buses, wires, and printed circuit boards.

The exemplary embodiments according to the present principles may be carried out by computer software implemented by the processor 510 or by hardware, or by a combination of hardware and software. As a non-limiting example, the exemplary embodiments according to the present principles may be implemented by one or more integrated circuits. The memory 520 may be of any type appropriate to the technical environment and may be implemented using any appropriate data storage technology, such as optical memory devices, magnetic memory devices, semiconductor-based memory devices, fixed memory and removable memory, as non-limiting examples. The processor 510 may be of any type appropriate to the technical environment, and may encompass one or more of microprocessors, general purpose computers, special purpose computers and processors based on a multi-core architecture, as non-limiting examples.

Figure 6:
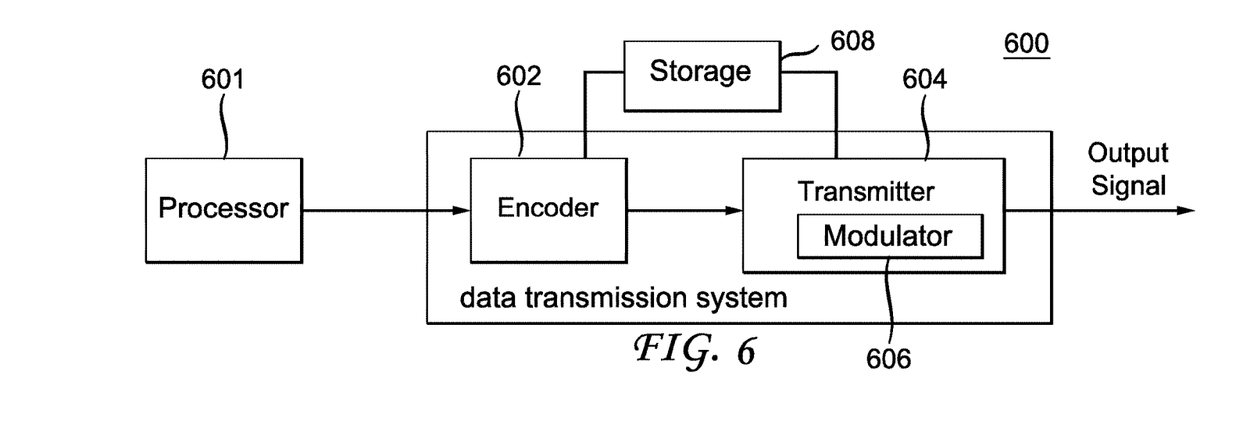
FIG. 6 illustrates a block diagram depicting an example of a video processing system that may be used with one or more implementations.

Referring to FIG. 6, a data transmission system 600 is shown, to which the features and principles described above may be applied. The data transmission system 600 may be, for example, a head-end or transmission system for transmitting a signal using any of a variety of media, such as, satellite, cable, telephone-line, or terrestrial broadcast. The data transmission system 600 also may be used to provide a signal for storage. The transmission may be provided over the Internet or some other network. The data transmission system 600 is capable of generating and delivering, for example, video content and other content.

The data transmission system 600 receives processed data and other information from a processor 601. In one implementation, the processor 601 generates the HDR video and/or represents an HDR picture using a single modulation value and an SDR picture representative of the HDR picture. The processor 601 may also provide metadata to 600 indicating, for example, the function used in the mapping curves or the values of constants.

The data transmission system or apparatus 600 includes an encoder 602 and a transmitter 604 capable of transmitting the encoded signal. The encoder 602 receives data information from the processor 601. The encoder 602 generates an encoded signal(s). Then encoder 602 may use, for example, method 200 as described in FIG. 2.

The encoder 602 may include sub-modules, including for example an assembly unit for receiving and assembling various pieces of information into a structured format for storage or transmission. The various pieces of information may include, for example, coded or uncoded video, and coded or uncoded elements. In some implementations, the encoder 602 includes the processor 601 and therefore performs the operations of the processor 601.

The transmitter 604 receives the encoded signal(s) from the encoder 602 and transmits the encoded signal(s) in one or more output signals. The transmitter 604 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 606. The transmitter 604 may include, or interface with, an antenna (not shown). Further, implementations of the transmitter 604 may be limited to the modulator 606.

The data transmission system 600 is also communicatively coupled to a storage unit 608. In one implementation, the storage unit 608 is coupled to the encoder 602, and stores an encoded bitstream from the encoder 602. In another implementation, the storage unit 608 is coupled to the transmitter 604, and stores a bitstream from the transmitter 604. The bitstream from the transmitter 604 may include, for example, one or more encoded bitstreams that have been further processed by the transmitter 604. The storage unit 608 is, in different implementations, one or more of a standard DVD, a Blu-Ray disc, a hard drive, or some other storage device.

Figure 7:
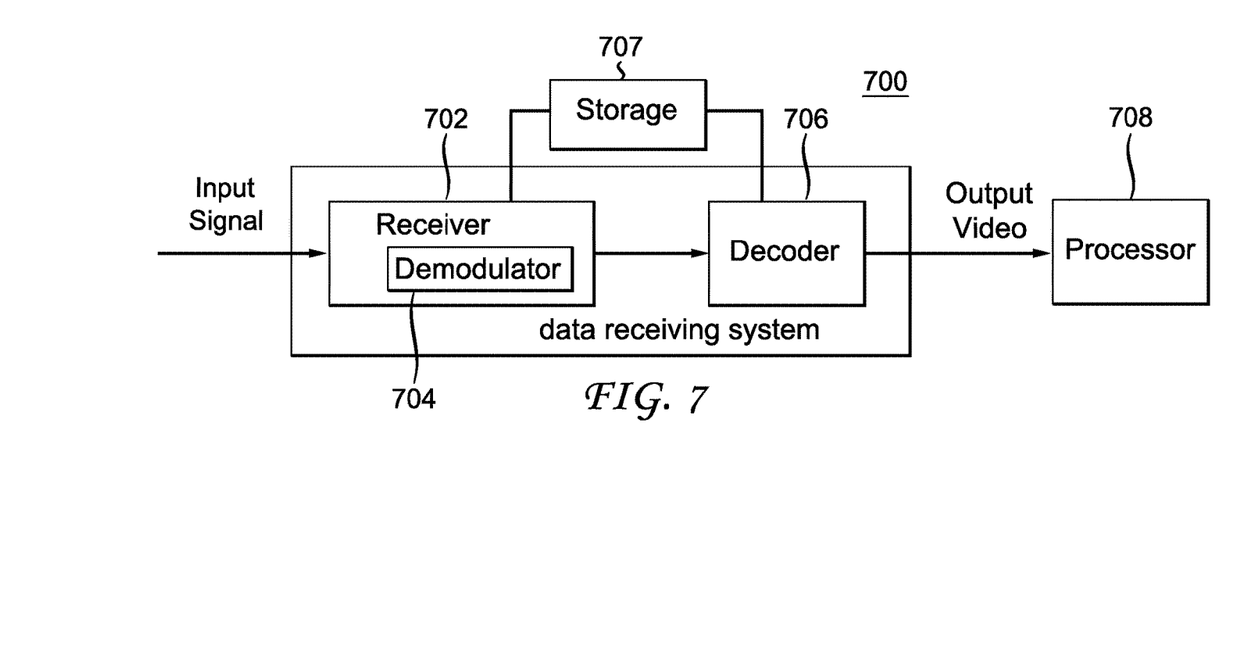
FIG. 7 illustrates a block diagram depicting another example of a video processing system that may be used with one or more implementations.

Referring to FIG. 7, a data receiving system 700 is shown to which the features and principles described above may be applied. The data receiving system 700 may be configured to receive signals over a variety of media, such as storage device, satellite, cable, telephone-line, or terrestrial broadcast. The signals may be received over the Internet or some other network.

The data receiving system 700 may be, for example, a cell-phone, a computer, a set-top box, a television, or other device that receives encoded video and provides, for example, decoded video signal for display (display to a user, for example), for processing, or for storage. Thus, the data receiving system 700 may provide its output to, for example, a screen of a television, a computer monitor, a computer (for storage, processing, or display), or some other storage, processing, or display device.

The data receiving system 700 is capable of receiving and processing data information. The data receiving system or apparatus 700 includes a receiver 702 for receiving an encoded signal, such as, for example, the signals described in the implementations of this application. The receiver 702 may receive, for example, a signal providing one or more of the HDR and SDR videos, or a signal output from the data transmission system 600 of FIG. 6.

The receiver 702 may be, for example, adapted to receive a program signal having a plurality of bitstreams representing encoded HDR pictures. Typical receivers perform functions such as, for example, one or more of receiving a modulated and encoded data signal, demodulating the data signal from one or more carriers using a demodulator 704, de-randomizing the energy in the signal, de-interleaving the data in the signal, and error-correction decoding the signal. The receiver 702 may include, or interface with, an antenna (not shown). Implementations of the receiver 702 may be limited to the demodulator 704.

The data receiving system 700 includes a decoder 706. The receiver 702 provides a received signal to the decoder 706. The signal provided to the decoder 706 by the receiver 702 may include one or more encoded bitstreams. The decoder 706 outputs a decoded signal, such as, for example, decoded video signals including video informations.

The data receiving system or apparatus 700 is also communicatively coupled to a storage unit 707. In one implementation, the storage unit 707 is coupled to the receiver 702, and the receiver 702 accesses a bitstream from the storage unit 707. In another implementation, the storage unit 707 is coupled to the decoder 706, and the decoder 706 accesses a bitstream from the storage unit 707. The bitstream accessed from the storage unit 707 includes, in different implementations, one or more encoded bitstreams. The storage unit 707 is, in different implementations, one or more of a standard DVD, a Blu-Ray disc, a hard drive, or some other storage device.

The output data from the decoder 706 is provided, in one implementation, to a processor 708. The processor 708 is, in one implementation, a processor configured for performing the SDR to HDR mapping. In some implementations, the decoder 706 includes the processor 708 and therefore performs the operations of the processor 708. In other implementations, the processor 708 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating a bitstream for a High Dynamic Range (HDR) picture, comprising:
   determining a value indicative of illumination information of the HDR picture;
   generating the bitstream including a Standard Dynamic Range (SDR) picture responsive to the HDR picture and the determined value, wherein illumination values of the HDR picture are scaled down by the determined value to form the SDR picture; and forcing a quad-tree representation of a portion of the HDR picture to only contain coding units (CUs) of a same size,
wherein the determined value is represented by a plurality of bits, and each of the plurality of bits is used to determine whether a first transform size or a second transform size is used for a corresponding CU of a plurality of CUs in a portion of the SDR picture.

2. The method of claim 1, wherein the value indicative of illumination information of the HDR picture is determined using an average, median, minimum or maximum value of the luminance values of the HDR picture.

3. The method of claim 1, wherein each one of the plurality of the bits is encoded as a flag indicative of a transform size.

4. The method of claim 1, wherein the transform size is determined for a first largest coding unit (LCU) of the SDR picture.

5. A method for decoding a bitstream including a High Dynamic Range (HDR) picture, comprising:
determining a value indicative of illumination information of the HDR picture, wherein said value is represented by a plurality of bits, and each of the plurality of bits is determined from a flag indicating whether a first transform size or a second transform size is used for a corresponding coding unit (CU) of a plurality of CUs for a portion of a Standard Dynamic Range (SDR) picture, wherein a quad-tree representation of the portion of the SDR picture only contains coding units of a same size; and
determining the HDR picture responsive to the determined value and the SDR picture included the bitstream, wherein the illumination values of the SDR picture are scaled up by the determined value to form the HDR picture.

6. The method of claim 5, wherein the determining a value determines a plurality of values for a plurality of respective spatial areas in the HDR picture.

7. The method of claim 5, wherein each one of the plurality of the bits is decoded as a flag indicative of a transform size.

8. The method of claim 5, wherein each of the plurality of bits is used to indicate the transform size for a respective one of a plurality of coding units in a portion of the SDR picture.

9. The method of claim 5, wherein a syntax element is used to indicate that the determined value is implicitly signaled.

10. The method of claim 5, wherein the determined value is determined from a portion of the bitstream representative of a first largest coding unit (LCU) of the SDR picture.

11. An apparatus for generating a bitstream for a High Dynamic Range (HDR) picture, comprising at least one memory and one or more processors, wherein the one or more processors are configured to:
determine a value indicative of illumination information of the HDR picture; and
generate the bitstream including a Standard Dynamic Range (SDR) picture responsive to the HDR picture and the determined value, wherein illumination values of the HDR picture are scaled down by the determined value to form the SDR picture; and
forcing a quad-tree representation of a portion of the HDR picture to only contain coding units (CUs) of a same size,
wherein the determined value is represented by a plurality of bits, and each of the plurality of bits is used to determine whether a first transform size or a second transform size is used for a corresponding CU of a plurality of CUs in a portion of the SDR picture.

12. The apparatus of claim 11, wherein each one of the plurality of the bits is encoded as a flag indicative of a transform size.

13. The apparatus of claim 11, wherein the value is determined for a first largest coding unit (LCU) of the SDR picture.

14. An apparatus for decoding a bitstream including a High Dynamic Range (HDR) picture, comprising at least one memory and one or more processors, wherein the one or more processors are configured to:
determine a value indicative of illumination information of the HDR picture, wherein said value is represented by a plurality of bits, and each of the plurality of bits is determined from a flag indicating whether a first transform size or a second transform size is used for a corresponding coding unit (CU) of a plurality of CUs for a portion of a Standard Dynamic Range (SDR) picture, wherein a quad-tree representation of the portion of the SDR picture only contains coding units of a same size; and
determining the HDR picture responsive to the determined value and the SDR picture included the bitstream, wherein illumination values of the SDR picture are scaled up by the determined value to form the HDR picture.

15. The apparatus of claim 14, wherein each one of the plurality of the bits is decoded as a flag indicative of a transform size.

16. The apparatus of claim 14, wherein the value is determined from a portion of the bitstream representative of a first largest coding unit (LCU) of the SDR picture.

* * * * *